Sept. 18, 1973   G. R. SCHAER   3,759,747
METHOD OF MAKING POROUS CONDUCTIVE SUPPORTS FOR ELECTRODES
Filed March 22, 1972

United States Patent Office 3,759,747
Patented Sept. 18, 1973

3,759,747
METHOD OF MAKING POROUS CONDUCTIVE SUPPORTS FOR ELECTRODES
Glenn R. Schaer, Columbus, Ohio, assignor to the United States of America as represented by the Administrator of the National Aeronautics and Space Administration
Filed Mar. 22, 1972, Ser. No. 236,985
Int. Cl. H01m 35/04
U.S. Cl. 136—36                25 Claims

ABSTRACT OF THE DISCLOSURE

Porous conductive supports for electrodes suitable for use in electrochemical cells are made by electroforming thin corrugated nickel foil, stacking pieces of the corrugated foil alternately with pieces of thin flat nickel foil, with the corrugations in successive corrugated pieces oriented at different angles, bonding the adjacent pieces of foil by heating in a hydrogen atmosphere, and cutting the bonded stack in planes substantially perpendicular to the foils.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

CROSS-REFERENCE TO RELATED APPLICATION

Methods according to the present invention are especially useful for making the supports in porous electrodes as disclosed and claimed in the United States patent application of John McCallum, Ser. No. 237,029, filed Mar. 22, 1972 (the same filing date as that of the present application).

BACKGROUND OF THE INVENTION

In conventional sintered nickel plaques used as supports in nickel cadmium and nickel zinc batteries the pores are not uniform in size or in shape and they are interconnected in a random manner. Because of this randomness the active material used in the battery electrodes made from such supports cannot be uniformly coated throughout with active material. Some of the smaller pores may be completely filled with active material and thus are of little or no use. In other areas of the electrode the active material may move from one pore to another as the battery is charged and discharged so that the distribution of the active material changes with time. Thus such electrodes are rather inefficient and can cause the batteries in which they are used to fail much sooner than they should.

The performance of porous electrodes in batteries and other electrochemical cells can be greatly improved if the supports for the active material have pores of uniform size extending completely through the electrode from one side to the other and with no interconnections between the pores. The present invention provides such supports wherein the pores are uniform in size, are not interconnected, and extend from one side of the electrode to the other to provide easy access for current to reach all of the electrochemically active material deposited in the pores. Thus the active material is used to its fullest capabilities and the capacity of the electrode is not reduced by any migration of material from one pore to another. Also higher discharge and charge rates can be used for the same size of electrode because of the direct connection of each pore to the side surfaces of the electrode and from there to any counterelectrodes in the cell or battery.

SUMMARY OF THE INVENTION

A typical method according to the present invention of making porous conductive supports for electrodes suitable for use in electrochemical cells comprises forming thin corrugated metal foil, stacking pieces of the corrugated foil, the corrugations in adjacent pieces being oriented at different angles, bonding the adjacent pieces of foil, and cutting the bonded stack in planes substantially perpendicular to the foils. Typically a piece of thin flat metal foil is placed between adjacent pieces of the corrugated foil.

Typical foils consist essentially of nickel, with the corrugated foil about 0.3 to 1 mil thick and the flat foil about 0.2 to 1 mil thick. The corrugations typically are substantially triangular in cross-section, with each corrugation about 2 to 6 mils high and 2 to 10 mils wide and the height at least about one-half the width. The density of the support preferably is less than about 25 percent. Alternate pieces of the corrugated foil typically are oriented with their corrugations in approximately the same direction, and the angle between the corrugations in successive pieces of the corrugated foil typically is about 5 to 40 degrees.

The pieces of foil typically are bonded by heating in a nonoxidizing atmosphere, which may comprise essentially hydrogen, and the adjacent pieces of foil preferably are bonded at substantially all contiguous points.

The planes in which the stack is cut typically are substantially parallel, about 25 to 50 mils apart, and approximately perpendicular to the direction bisecting the angle between the corrugations in successive pieces of the corrugated foil. Before the cutting, the bonded structure typically is filled with an epoxy which is removed after the cutting by dissolving in hot chromic acid, typically about 250 to 600 grams per liter of chromic acid at about 140 to 200 F.

The corrugated foil typically is electroformed on a conductive corrugated surface wherein the corrugations are substantially triangular in cross-section and are polished to a highly smooth surface finish from which the electroformed foil is readily removable. Typically it is electroformed on a cylindrical mandrel comprising a continuous helical threaded portion, the thread being substantially triangular in cross-section and polished to a highly smooth surface finish from which the electroformed foil is readily removable. The forming surface typically is subjected to a fine polishing wherein a slurry of fine abrasive particles in water is spread over the surface by a brush of fine wires, the ends of which typically are provided with sharp points by chemical etching, and then is plated with bright chromium.

The invention includes also the porous conductive supports for electrodes made by the methods disclosed and claimed herein.

Figure 1:
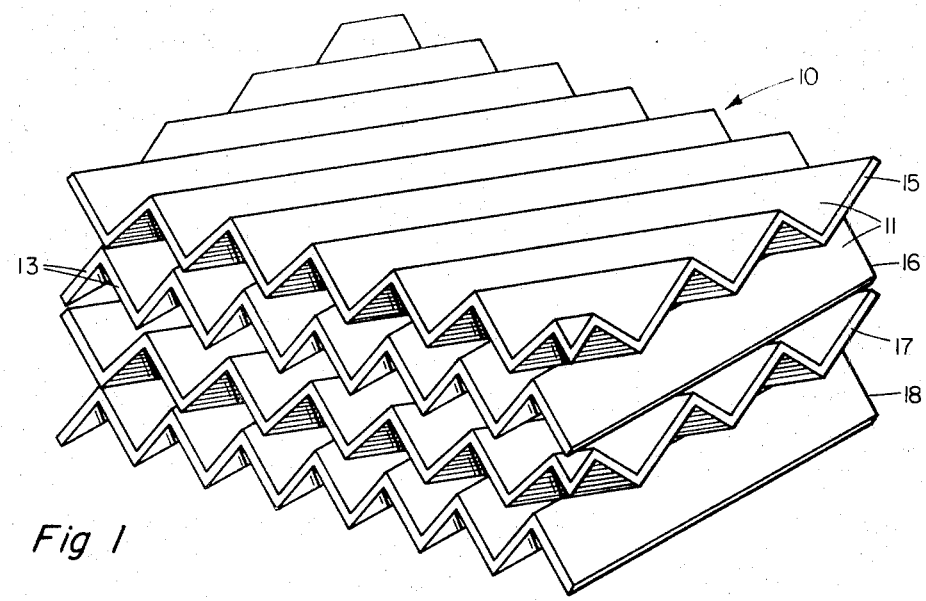
FIG. 1 is a perspective view of a portion of a typical electrode support as made by methods according to the present invention.

Both figures are highly magnified and not to scale.

DESCRIPTION OF PREFERRED EMBODIMENTS

A typical method according to the present invention of making porous conductive supports 10 for electrodes suitable for use in electrochemical cells comprises forming thin corrugated metal foil, stacking pieces 11 of the corrugated foil, the corrugations 13 in adjacent pieces 11 being oriented at different angles, as in the drawings, bonding the adjacent pieces of foil, and cutting the bonded stack in planes substantially perpendicular to the foils. Typically a piece 12 of thin flat metal foil is placed between adjacent pieces 11 of the corrugated foil, as in FIG. 2.

Typical foils 11, 12 consist essentially of nickel, with the corrugated foil 11 about 0.3 to 1 mil thick and the flat foil 12 about 0.2 to 1 mil thick. The corrugations 13 typically are substantially triangular in cross-section (i.e., a cross-sectional or edge view has the shape of a triangular wave), with each corrugation 13 about 2 to 6 mils high and 2 to 10 mils wide and with the height of each corrugation 13 at least about one-half of its width. The density of the support 10 (i.e., the degree to which it fills the space within its outer dimensions) preferably is made to be less than about 25 percent. Alternate pieces 15, 17, etc. and 16, 18, etc., of the corrugated foil 11 typically are oriented with their corrugations in approximately the same direction, and the angle between the corrugations in successive pieces 15 and 16, 16 and 17, 17 and 18, etc. of the corrugated foil 11 typically is about 5 to 40 degrees.

Figure 2:
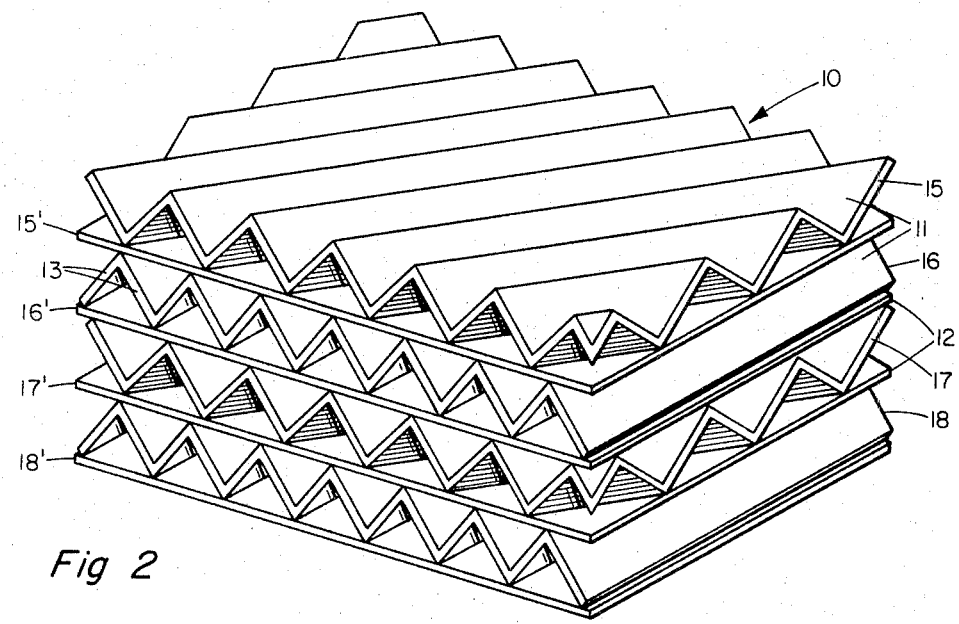
FIG. 2 is a similar view of a portion of another such electrode support.

The pieces of foil 11, 12 typically are bonded by heating in a nonoxidizing atmosphere, which may comprise essentially hydrogen, and the adjacent pieces 15 and 16, 16 and 17, 17 and 18, etc. in FIG. 1; 15 and 15', 15' and 16, 16 and 16', 16' and 17, etc. in FIG. 2, of foil 11, 12 preferably are bonded at substantially all contiguous points. Thus maximum strength is provided, and in the support 10 in FIG. 2 each passage formed by a corrugation 13 and the flat foil 12 bonded thereto is separate from every other such passage.

The planes in which the stack is cut (i.e., the planes of the edges at the lower left and upper right in each figure) typically are substantially parallel, about 25 to 50 mils apart, and approximately perpendicular to the direction bisecting the angle between the corrugations 13 in successive pieces of the corrugated foil. Thus if the angle between corrugations is about 15 degrees, each corrugation 13 in the pieces 15, 17, etc. is about 7.5 degrees from the perpendicular to the sides of the support 10 in one direction and each corrugation 13 in the pieces 16, 18, etc. is about 7.5 degrees from the perpendicular in the opposite direction. Before the cutting, the bonded structure typically is filled with an epoxy which is removed after the cutting by dissolving in hot chromic acid, typically about 250 to 600 grams per liter of chromic acid at about 140 to 200 F.

The corrugated foil 11 typically is electroformed on a conductive corrugated surface wherein the corrugations are substantially triangular in cross-section and are polished to a highly smooth surface finish from which the electroformed foil is readily removable. Typically it is electroformed on a cylindrical mandrel comprising a continuous helical threaded portion as in a bolt, but with the thread substantially triangular in cross-section and polished to a highly smooth surface finish from which the electroformed foil is readily removable. The forming surface typically is subjected to a fine polishing wherein a slurry of fine abrasive particles in water is spread over the surface by a brush of fine wires, the ends of which typically are provided with sharp points by chemical etching, and then is plated with bright chromium.

The invention includes also the porous conductive supports for electrodes made by the methods disclosed and claimed herein.

Examples

Nickel plaques resembling a microscopic honeycomb were made from electroformed corrugated and flat foils. Many layers of these foils were stacked and held in a graphite fixture and bonded by heating in a hydrogen atmosphere to make three different honeycomb configurations.

A structure similar to that in FIG. 2 was made by alternating flat and corrugated foils so that all the corrugations were parallel. When the honeycomb structures were sintered, some shrinkage occurred because the flat foils warped when the corrugations were not adjacent to each other. The corrugated foils partly nested and bent the flat foils. To avoid such difficulties it is preferred that the corrugations in successive pieces of the corrugated foil be oriented at different angles.

A structure as in FIG. 1 was made by stacking corrugated foils when alternate foils turned about 30 degrees with respect to the corrugation lines. In this way, the foils could not nest. Then, after slicing the structure into 30-mil-thick plaques, each 10-mil corrugation would have at least one contact point with an adjoining corrugation. With this geometry most of the internal surface area is available for accetping active material. However, the structure is somewhat weaker than that of FIG. 2 because bonding between the corrugated foils must be at separate points rather than along lines.

The structure that is presently preferred for the honeycomb plaques is that of FIG. 2. Flat and corrugated foils were stacked with every other corrugated foil turned 30 degrees. This structure provides (1) a geometry which resists distortion during the bonding, (2) a strong structure because bonding between foils is along lines instead of at single points, and (3) a total surface area in a plaque which is higher per unit weight because the flat foils were made thinner than the corrugated foils.

Nickel plaques with different pores sizes were made for comparing performance with pore size after impregnating the pores with cadmium compounds. Corrugated foils required for fabricating all pore sizes were electroformed. Five such corrugated foils had peak-to-peak dimensions of approximately 0.025, 0.018, 0.013, 0.010, and 0.0080 cm. (10, 7, 5, 4, and 3 mils) respectively. Assuming an equilateral, triangular shaped pore, the diameters of inscribed circles in these pores would measure 0.015, 0.010, 0.008, 0.006, and 0.005 cm. (6, 4, 3, 2.5, and 2 mils) respectively. Such pore sizes approximate the results expected of mercury porosimeter measurements.

Before the present invention, no known method was available for making a mandrel suitable for electroforming corrugated nickel sheets thin enough and with narrow enough grooves to allow the honeycomb plaques to be assembled with the desired pore sizes. A presently preferred technique was developed for machining the necessary threads on a rod. These threads were polished and chromium plated to make the mandrels usable.

The following preferred steps were eventually developed to make an electroforming mandrel which can be used to make replicate corrugated foils:

Step 1. Machine a 2-inch diameter brass bar about 15 inches long to the true surface and leave a smooth finish.
Step 2. Machine threads in the bar in one cut using a specially sharpened tool.
Step 3. Check depth of cut with RTV silicone rubber replica.
Step 4. File a flat side on the mandrel about ¼ to ⅜ inch wide to provide a starting edge for removing the electroformed foils.
Step 5. Polish the threads lightly with 600-grit abrasive paper to remove burrs from the top of the threads.
Step 6. Polish the sides of the threads using a fine brass brush with pointed wires and a slurry of fine abrasive.
Step 7. Clean and inspect the polished mandrel.
Step 8. Electroplate the mandrel with bright nickel and bright chromium.
Step 9. Apply electroplater's tape to mask the ends of the mandrel and the flattened side made in Step 4.
Step 10. Clean the mandrel with a soft fiber brush and magnesium oxide slurry before starting the electroforming sequence described hereinafter.

Details

Step 1. Several different materials were evaluated for mandrel materials including brass, cartridge brass, electroplated brgiht copper, aluminum, stainless steel, and several plastics. Solid brass 70–30 bar stock was used because of its availability. Cartridge brass, which had a finer grain size, could be machined with a slightly smoother surface than the bar stock. A bright-copper electroplate (plated in a Dayton Bright Acid Copper Bath, Cu Flex) about 10 mils thick applied to a brass bar produced the smoothest machined threads of any steel. However, the threads still required polishing as described in Steps 5 and 6 to produce the smooth surface required for easy removal of the electroformed foil. Copper-plated brass is recommended for machining mandrels.

Step 2. Machining threads in brass rods with sharp "V" grooves was accomplished by using high-speed tool-steel cutters ground with a chip breaker, or chip groove. To produce uniformly shaped threads, the tool was used in a direction that is the reverse of that normally used for threading rods with such a tool. When the threads were cut by moving the tool in the usual direction, the threads were distorted. One side of each thread was almost perpendicular to the axis of the bar, while the other side had nearly the correct angle. This reversal of normal threading technique was required because the threads were cut in one pass. The cutting edges of the tool were polished with 400-grit silicon carbide abrasive paper until a razor-sharp edge was obtained. Final honing of the edges was done on a slowly rotating brass lap with 3-micron diamond-paste abrasives. One tool was used for machining six mandrels and could have been used for additional machining because the cutting edge was still sharp.

Thread cutting was done with a 13-inch lathe using a cutting feed because thread-cutting gearing would not produce the fine threads needed. Because of this need to use a cutting feed, full thread depths were cut in one pass using a slow rotational speed of under 50 r.p.m.

Stainless steel was successfully machined using a high-speed threading tool and cutting threads with a 10-mil pitch. The first reusable mandrel was made by electropolishing a threaded 304 stainless steel rod of 2-inch diameter and 15-inch length. This mandrel was used to electroform the corrugated foils for the first honeycomb structure.

Step 3. To inspect the thread profile, a replica of the threads was made with a silicone rubber (RTV–30 General Electric Co., catalyzed with Catalyst T-9, M&T Chemical, Inc.), sections of which were cut with a sharp knife and examined microscopically. When the replicas showed uniform thread angles and the depths of the grooves were at least 0.6 times the thread pitch, the mandrel was satisfactory. If the threads were not uniform with the required depth, the mandrel was remachined and threads were recut by repeating Steps 1 and 2. The RTV silicone rubber allowed a quick inspection to be made before removing the mandrel from the lathe.

Step 4. A smooth file was used to produce a flat side on the mandrel about ¼ to ⅜ inch wide. The purpose of the flat strip was to provide a starting edge for removing the electroformed foils from the mandrel. Any scratches produced by filing were removed with fine (400 grit) abrasive paper.

Step 5. The machined mandrel had small burrs on the top of each thread. These were removed with abrasive paper (600-grit) while rotating the mandrel on a lathe. Only light pressure was used in order to prevent distortion of the tops of the threads. Abrasion was continued until the burrs appeared by examination at 120X to be removed.

Step 6. Polishing the threads after Step 5 was a very important step. Any nicks or pits remaining in the sides of the threads acted as locks to prevent easy removal of the electroformed foils. To accomplish this polishing, a brush with pointed 3-mil brass wires was held lightly against the rotating mandrel. Three water suspensions of 1.0, 0.5, and 0.05-micron alumina were used in succession to polish the threads. The mandrel was rotated in both directions to insure polishing of both sides of the threads. A rotational speed of 1000 r.p.m. was used. Care was needed to maintain a dilute slurry of abrasive material on the brush. If too little water was used, the alumina packed on the brush acted like a solid abrasive block and cut the tops of the threads. The brass brush was dipped for a few seconds in 300 g./l. nitric acid solution to point the ends of the wires.

Step 7. Cleaning to remove the polishing residue from the threads was accomplished by first brushing the mandrel with a dry pointed-wire brass brush, then using a commercial electrolytic cleaner commonly used for electrocleaning. A microscopic examination of the threaded mandrel at 120X was made to determine if polishing had removed most surface defects. When the mandrel was judged smooth enough, the next step was initiated.

Step 8. The mandrel was cleaned for electroplating using conventional techniques and was plated with 0.3 mil of bright nickel (Harshaw Perglow Bright Nickel Bath) and then about 0.5 to 1.0 mil of bright chromium (Chromic acid, 250 g./l.; sulfuric acid, 2.2 g./l.; fluosilicic acid, 7.5 g./l; operated at 120–125 F.) using a mixed sulfate-fluosilicate catalyzed chromic acid bath. These plating steps also were done using conventional plating techniques. The purposes of plating were (1) to improve the smoothness of the mandrel with the bright nickel plating and (2) to provide a hard chromium surfave. Chromium is an ideal electroforming surface because nickel electroplates will not adhere to chromium, so they can be removed easily.

Step 9. Application of the presure-sensitive tape was a convenient method for masking areas where deposit was undesirable. This masking included a strip on the flattened side of the mandrel.

Step 10. Cleaning of the chromium surface to remove fingerprints and other dirt was done with a fiber bristle brush and magnesium oxide-water slurry. Electrolytic cleaning was not used because the hot alkaline solution would have removed the masking material.

The mandrels were placed in a sulfamate nickel plating bath. (Sulfamate nickel bath, Type SN, obtained from Allied Chemical Company.) The mandrels were rotated at 7 r.p.m. and plated at 130° F., pH 4.0±0.2, 60–80 a.s.f., for 4 to 5 minutes to apply 0.3 to 0.4 mil of plate. To remove the foil, the plated mandrel was washed in cold water and the edge of the nickel foil was lifted with a sharp-pointed tool along the flat side of the mandrel. After removal of a foil, the mandrel was replaced in the nickel electroforming bath for electroforming the next foil.

A similar technique was used for electroforming flat foils, except that a smooth cylindrical mandrel was used. Flat foils about 0.2 mil thick were formed and used for fabricating the honeycomb structure.

Honeycomb structures as shown in FIGS. 1 and 2 were made by stacking electroformed foils 2.86 x 5.0 cm. (1.1 x 2 inch) in a graphite block. A weight was placed on the top of the block to compress the stack to a density of about 20 percent, the compressed height being about 3.2 cm. (1.25 inch), and the assembly was heated to 1940° F. for 1 hour in hydrogen. Bonding was adequate with this heating cycle. The configuration shown in FIG. 2 was used to fabricate a honeycomb block about 2.86 x 2.86 x 5.0 cm. (1.1 x 1.1 x 2 inches) using the five different sizes of corrugated foils.

Slicing by grinding the first set of honeycomb plaques from the honeycomb block was accomplished by filling the structure with Apiezon wax and cutting thin slices with a 0.20 cm. (80 mils) thick grinding wheel. After grinding, the slices were abraded with 320-grit silicon carbide paper to remove grinding burrs. An electrolytic etch in 10 percent hydrochloric acid for about 15 seconds at 32 amp./sq. cm. of plaque area was used for final burr removal. The wax was then dissolved in benzene.

The other four sizes of honeycomb blocks were filled with an epoxy mixture of Epi-Rex 5077 (67 percent by volume) and Epi-Cure 856 (33 percent by volume) (both from Celanese Resins Division of Celanese Coatings Company) and cured for 48 hours at room temperature before being cut into 2.3 cm. thick slices. The epoxy was far superior to the wax because the thermal stabiilty of the epoxy allowed faster grinding rates.

After the plaques were sliced from the structure, they were polished to a thickness of 0.20 cm. on abrasive paper (600-grit silicon carbide) to remove grinding marks and then were etched electrolytically in 1.2 normal hydrochloric acid to remove polishing burrs. Removal of the epoxy filler was accomplished in 1 to 2 hours in a 500 g./l. chromic acid solution heated to 82 to 88° C.

Honeycomb plaques were made 2.86 cm. (1⅛ inch) square and 0.084±0.005 cm. (33±2 mils) thick. The edges were compressed with a coining die to form a solid wall at each end (upper left and lower right ends in FIGS. 1 and 2) to leave a porous area 2.54 cm. (1 inch) square. Plaque characteristics were computed and the resulting values of the five sizes of honeycomb plaques are given in Table 1.

The flexibility of unimpregnated plaque material was measured by bending the plaques tightly around glass rods having diameters from 0.32 to 2.2 cm. The honeycomb plaques were bent in two directions at right angles to each other, that is, parallel and perpendicular to corrugations of nickel sheets. All of the honeycomb plaques could be bent around any of the rods in either direction without the bonds between nickel sheets being broken. This resistance to breaking, even when severely bent, shows that the honeycomb plaques have a high degree of structural integrity and that the bonding of the stacked foils was complete throughout the block of stack foils.

When a sintered-powder plaque was bent, the sintered powder cracked in the direction parallel with the bend. The sintered powder did not break away from the plaque, which indicates that it was properly bonded through the expanded nickel substrate.

Electrical resistance measurements were made both perpendicular to and parallel with the direction of the foils in the plaques. The measurements are given in Table 2, which shows the electrical resistances of the honeycombs to be about ⅓ larger to ½ smaller than resistivities measured for sintered-powder plaques.

Nickel honeycomb plaques fabricated as described above were impregnated with cadmium hydroxide according to the method of Fleischer, Trans. Electrochem. Soc., 94 (6), 289–299 (1948). The number of impregnation cycles required to fill approximately 40 percent of the pore volume of these plaques with cadmium hydroxide ranged from four to eight depending on the size of the pore. The cadmium electrodes thus prepared performed on repeated charge-discharge cycling in a manner similar to electrodes prepared from sintered powder plaques. The potentials of the uniform plaques measured with respect to a reference electrode at high rates were about 20 to 30 mv. higher on discharge and about 10 to 15 mv. lower on charge than for electrodes made from sintered powder plaques at the 4 C rate (where "C" means the rate at which the electrode would be charged or discharged to its capacity in one hour) which indicates that polarization losses are decreased with the new plaque structure. The decreased polarization allows charging and discharging at rates higher by two to five times over commercial cadmium electrodes. Charge and discharge rates as high as 4 C have been obtained with no difficulty. At such rates an increase in polarization of only about 25 mv. is observed over charge and discharge performed at the C rate.

Microscopic examination of electrodes made in this way shows that the pores are filled with finely divided crystals of cadmium and cadmium hydroxide which have a very large surface area even though the uniform nickel plaques have a relatively small internal surface area.

Further details of the above and other related examples are contained in the Final Progress Report on Development of Improved Plaque Material for Aerospace Nickel-Cadmium Cells, Contract No. NAS 5–21105, to Goddard Space Flight Center, by G. R. Schaer, F. Goebel, A. H. Reed, and J. McCallum, Batelle Memorial Institute—Columbus Laboratories, Mar. 24, 1971.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. A method of making porous conductive supports for electrodes suitable for use in electrochemical cells comprising
   forming thin corrugated metal foil,
   stacking pieces of the corrugated foil,
   the corrugations in adjacent pieces being oriented at different angles,
   bonding the adjacent pieces of foil, and
   cutting the bonded stack in planes substantially perpendicular to the foils.

2. A method as in claim 1, comprising placing a piece

TABLE 1.—PHYSICAL CHARACTERISTICS OF HONEYCOMB PLAQUES

| Corrugation width, cm. | Porosity, percent | Internal surface area | | Pore size, cm.[c] | Foil thickness, cm. | |
|---|---|---|---|---|---|---|
| | | Cm.²/g.[a] | Cm.²/g.[b] | | Flat | Corrugated |
| 0.025 | 82 | 204 | 384 | 0.0153 | 0.0008 | 0.0013 |
| 0.018 | 86 | 231 | 306 | 0.0107 | 0.0009 | 0.0010 |
| 0.013 | 76 | 305 | 367 | 0.0076 | 0.0007 | 0.0007 |
| 0.010 | 77 | 305 | 371 | 0.0061 | 0.0006 | 0.0008 |
| 0.008 | 66 | 246 | 381 | 0.0049 | 0.0006 | 0.0011 |
| Powder plaques [d] | 80 | 880 | | 0.0015 | | |

[a] Internal area was calculated from foil thickness and length measured from cross sections of plaques.
[b] Internal area was calculated from measuring weight and thickness of corrugated foil and assuming the corrugated foils had sharp corners and all angles were 60 degrees. The difference between the two values resulted from rounded corners and shrinkage during heat bonding.
[c] Pore size calculated as inscribed circle in triangular-shaped pore.
[d] Typical conventional sintered nickel carbonyl powder plaques.

TABLE 2.—ELECTRICAL RESISTANCE OF PLAQUES

| Plaque type | Resistance, microohms | |
|---|---|---|
| | Perpendicular to foils | Parallel with foils |
| Sintered powder | 2.5–2.8 | 2.5–2.8 |
| 0.015 dm. honeycomb | 3.3 | (¹) |
| 0.010 cm. honeycomb | 2.4 | 3.3 |
| 0.0076 cm honeycomb | 2.1 | 2.8 |
| 0.0061 cm. honeycomb | 1.35 | 1.7 |
| 0.0049 cm. honeycomb | 1.3 | 1.5 |

¹ Not measured.

of thin flat metal foil between adjacent pieces of the corrugated foil.

3. A method as in claim 1, wherein the foils consist essentially of nickel.

4. A method as in claim 2, wherein the corrugated foil is about 0.3 to 1 mil thick.

5. A method as in claim 4, wherein the flat foil is about 0.2 to 1 mil thick.

6. A method as in claim 1 wherein the corrugations are substantially triangular in cross-section.

7. A method as in claim 1, wherein each corrugation is about 2 to 6 mils high and 2 to 10 mils wide.

8. A method as in claim 7, wherein the height of each corrugation is at least about one-half of its width.

9. A method as in claim 7, wherein the density of the support is less than about 25 percent.

10. A method as in claim 1, wherein alternate pieces of the corrugated foil are oriented with their corrugations in approximately the same direction.

11. A method as in claim 10, wherein the angle between the corrugations in successive pieces of the corrugated foil is about 5 to 40 degrees.

12. A method as in claim 1, wherein the pieces of foil are bonded by heating in a nonoxidizing atmosphere.

13. A method as in claim 12, wherein the atmosphere comprises essentially hydrogen.

14. A method as in claim 1, wherein the adjacent pieces of foil are bonded at substantially all contiguous points.

15. A method as in claim 1, wherein the planes in which the stack is cut are substantially parallel and about 25 to 50 mils apart.

16. A method as in claim 11, wherein the planes in which the stack is cut are approximately perpendicular to the direction bisecting the angle between the corrugations in successive pieces of the corrugated foil.

17. A method as in claim 1, wherein the bonded structure is filled with an epoxy before the cutting.

18. A method as in claim 17, wherein the epoxy filler is removed after the cutting by dissolving in hot chromic acid.

19. A method as in claim 17, wherein the epoxy filler is removed after the cutting by dissolving in about 250 to 600 grams per liter of chromic acid at about 140 to 200 F.

20. A method as in claim 1, wherein the corrugated foil is electroformed.

21. A method as in claim 1, wherein the corrugated foil is electroformed on a conductive corrugated surface wherein the corrugations are substantially triangular in cross-section and are polished to a highly smooth surface finish from which the electroformed foil is readily removable.

22. A method as in claim 1, wherein the corrugated foil is electroformed on a cylindrical mandrel comprising a continuous helical threaded portion, the thread being substantially triangular in cross-section and polished to a highly smooth surface finish from which the electroformed foil is readily removable.

23. A method as in claim 21, wherein the surface is subjected to a fine polishing wherein a slurry of fine abrasive particles in water is spread over the surface by a brush of fine pointed wires.

24. A method as in claim 23, wherein the ends of the wires are provided with sharp points by chemical etching.

25. A method as in claim 23, wherein the surface is plated with bright chromium after the fine polishing.

References Cited
UNITED STATES PATENTS

| | | | |
|---|---|---|---|
| 2,275,195 | 3/1942 | Sizelove | 136—36 X |
| 2,333,343 | 11/1943 | Sendzimir | 29—470.9 |
| 3,068,565 | 12/1962 | King et al. | 29—472.3 |
| 3,206,332 | 9/1965 | Juda | 136—120 F C |
| 3,206,334 | 9/1965 | Ehrenfeld | 136—120 F C |

ANTHONY SKAPARS, Primary Examiner

U.S. Cl. X.R.

136—45